(12) United States Patent  
Eromäki

(10) Patent No.: US 7,616,255 B2
(45) Date of Patent: Nov. 10, 2009

(54) SINGLE MOTOR/ACTUATOR FOR ADJUSTING TWO ASSEMBLIES

(75) Inventor: Marko Eromäki, Tampere (FI)

(73) Assignee: Nokia Corporation, Espoo (FI)

( * ) Notice: Subject to any disclaimer, the term of this patent is extended or adjusted under 35 U.S.C. 154(b) by 358 days.

(21) Appl. No.: 11/823,104

(22) Filed: Jun. 25, 2007

(65) Prior Publication Data

US 2008/0316322 A1    Dec. 25, 2008

(51) Int. Cl.
*H04N 5/225* (2006.01)
(52) U.S. Cl. ...................................... 348/360
(58) Field of Classification Search ................. 348/357, 348/360
See application file for complete search history.

(56) References Cited

U.S. PATENT DOCUMENTS 5,592,250 A    1/1997   Shimizu ...................... 396/79

6,456,796 B1*  9/2002   Tanaka et al. ............... 396/131
7,454,135 B2* 11/2008   Nakata et al. ............... 396/133
2005/0169622 A1* 8/2005  Uemura et al. ................ 396/72

FOREIGN PATENT DOCUMENTS

| EP | 1431794 A1 | 6/2004 |
| JP | 60 263911 A | 12/1985 |
| JP | 2002 350709 A | 12/2002 |

* cited by examiner

*Primary Examiner*—Tuan Ho

(57) ABSTRACT

The specification and drawings present a new method, apparatus and software product for a single motor/actuator adjustment of two assemblies (e.g., for performing zoom and auto-focus functions) for image adjustment using a clutch unit (e.g., a switch) in image adjustment modules of electronic devices. The clutch unit can be used to engage one of two lead screws having a common axis one at a time with a driving shaft (e.g., having the same common axis), so these two lead screws can operate independently in order to provide adjustments of the two assemblies.

29 Claims, 6 Drawing Sheets

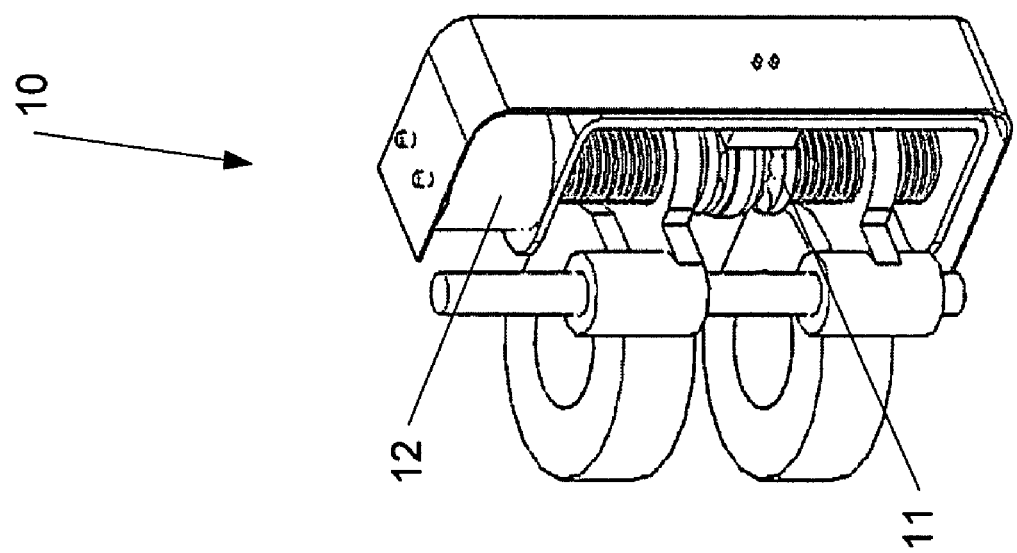
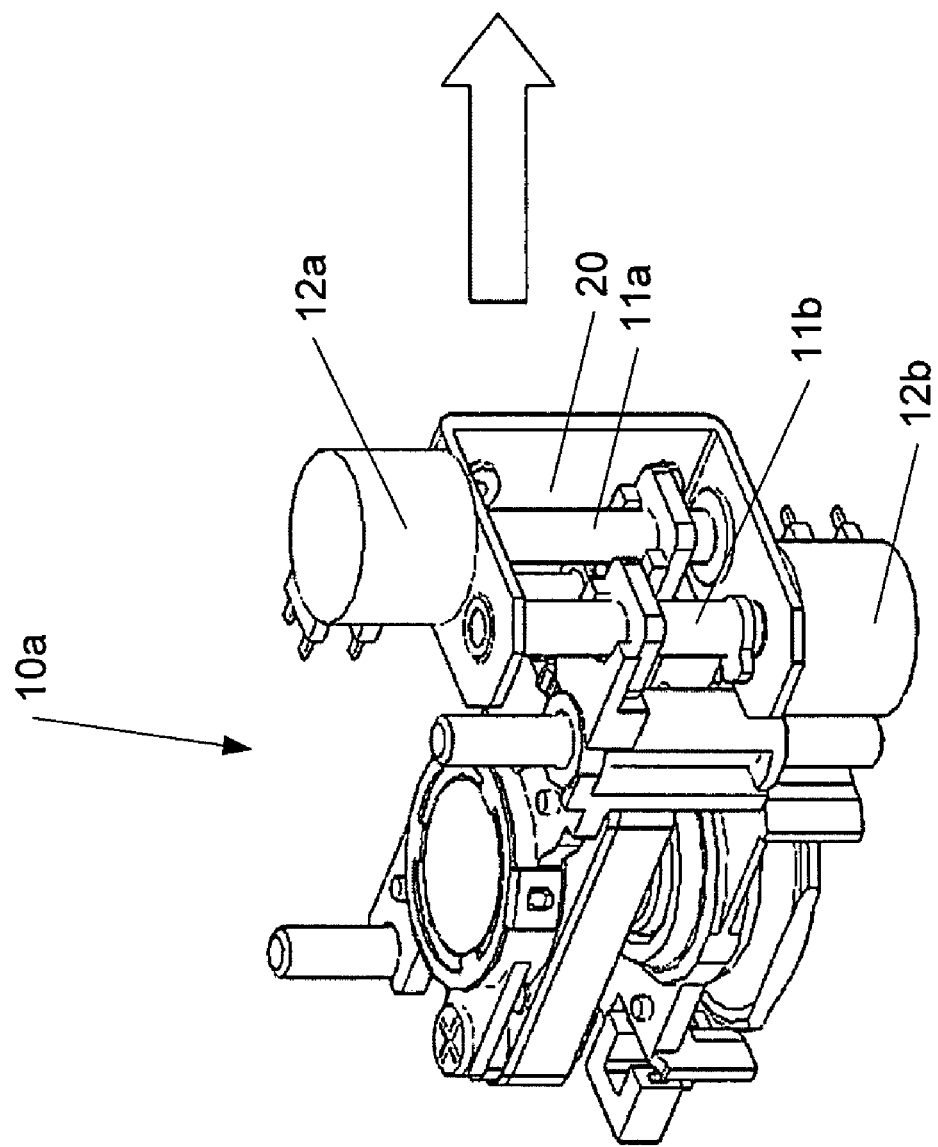
Figure 1b
Figure 1a

SINGLE MOTOR/ACTUATOR FOR ADJUSTING TWO ASSEMBLIES

TECHNICAL FIELD

The present invention relates generally to electronic devices and, more specifically, to a single motor/actuator adjustment of two assemblies for image adjustment in electronic devices.

BACKGROUND ART

Typically in cameras with optical zoom and auto-focus, two separate actuator units are being used to operate different lens groups, e.g., zoom and auto-focus lens groups. The units are driven back and forth, e.g., with stepper motors, or piezo actuators. Due to a relatively large dimentions of lenses, motors, mechanical shutter elements and position detectors inside, such a module becomes easily very large. Due to several components inside of a typical high end zoom module (2 actuators, lens groups, mechanical shutter, positioning sensing elements, etc.), the overall size can be easily, e.g., 20×20×30 mm which makes it difficult to fit inside of a mobile phone. Typically, high quality optics is a driving feature for such a camera, meaning that the diameter of a lens group (e.g., comprising 8 pieces) is quite large and its miniaturization is difficult without sacrificing the image quality and technical capablities of the camera.

DISCLOSURE OF THE INVENTION

According to a first aspect of the invention, an image adjustment module, comprises: a first assembly; a second assembly; a first lead screw configured to hold and move the first assembly; a second lead screw configured to hold and move the second assembly, wherein the first lead screw and the second lead screw have a common axis; a driving shaft configured to rotate freely inside of the first lead screw and of the second lead screw; and a clutch unit, configured to engage the first lead screw or the second lead screw one at a time, and comprises a rotatable element configured to rotate together with the driving shaft for rotating the first lead screw or the second lead screw one at a time when the clutch is engaged with the first lead screw or the second lead screw in order to provide corresponding movement along the common axis according to a predetermined criterion of the first assembly or the second assembly.

According further to the first aspect of the invention, the first assembly may comprise a zoom lens group configured to zoom the optical image of an object, and the second assembly may comprise an auto-focus lens group configured to auto-focus an optical image of the object.

Further according to the first aspect of the invention, the first assembly or the second assembly may comprise at least one of: a lens group comprising one or more lenses, a shutter, an optical filter, an aperture, and a lens cover.

Still further according to the first aspect of the invention, the clutch unit may further comprise: an actuator; and a bushing rigidly connected to the actuator and configured to move by the actuator along the common axis for engaging with the first lead screw or the second lead screw, wherein the rotatable element is inside of the bushing and configured to provide the engaging of the clutch unit with the first lead screw or the second lead screw to provide the rotating of the first lead screw or of the second lead screw. Yet further, the actuator may be a magnetic solenoid.

According yet further to the first aspect of the invention, the driving shaft may comprise a rib configured to rotate the rotatable element.

According still further to the first aspect of the invention, the rotatable element may have a toothed shape on top and bottom surfaces to provide gripping with the first lead screw or with the second lead screw to provide the rotating of the first lead screw or of the second lead screw.

According further still to the first aspect of the invention, the image adjustment module may further comprise a motor configured to rotate the driving shaft. Yet further, the motor may be a stepper motor.

Yet still further according to the first aspect of the invention, the first lead screw and the second lead screw may be hollow tubes with threads on an outer surface for providing holding and moving of the first assembly and the second assembly.

Still yet further according to the first aspect of the invention, the image adjustment module may be a part of an electronic device configured for capturing images.

According to a second aspect of the invention, an electronic device, comprises: an image adjustment module, which comprises: a first assembly; a second assembly; a first lead screw configured to hold and move the first assembly; a second lead screw configured to hold and move the second assembly, wherein the first lead screw and the second lead screw have a common axis; a driving shaft configured to rotate freely inside of the first lead screw and of the second lead screw; and a clutch unit, configured to engage the first lead screw or the second lead screw one at a time, and comprises a rotatable element configured to rotate together with the driving shaft for rotating the first lead screw or the second lead screw one at a time when the clutch is engaged with the first lead screw or the second lead screw in order to provide corresponding movement along the common axis according to a predetermined criterion of the first assembly or the second assembly; a switch module, configured to provide a switch signal to the clutch unit for switching the clutch unit to be engaged with the first lead screw or with the second lead screw.

According further to the second aspect of the invention, the first assembly may comprise a zoom lens group configured to zoom the optical image of an object, and the second assembly may comprise an auto-focus lens group configured to auto-focus an optical image of the object.

Further according to the second aspect of the invention, the first assembly or the second assembly may comprise at least one of: a lens group comprising one or more lenses, a shutter, an optical filter, an aperture, and a lens cover.

Still further according to the second aspect of the invention, the clutch unit may further comprise: an actuator; and a bushing rigidly connected to the actuator and configured to move by the actuator along the common axis for engaging with the first lead screw or the second lead screw, wherein the rotatable element is inside of the bushing and configured to provide the engaging of the clutch unit with the first lead screw or the second lead screw to provide the rotating of the first lead screw or of the second lead screw. Still further, the actuator may be a magnetic solenoid.

According yet further to the second aspect of the invention, the driving shaft may comprise a rib configured to rotate the rotatable element.

According still further to the second aspect of the invention, the rotatable element may have a toothed shape on top and bottom surfaces to provide gripping with the first lead screw or with the second lead screw to provide the rotating of the first lead screw or of the second lead screw.

According further still to the second aspect of the invention, the electronic device may further comprise a motor or a stepper motor configured to rotate the driving shaft.

According yet further still to the second aspect of the invention, the first lead screw and the second lead screw may be hollow tubes with threads on an outer surface for providing holding and moving of the first assembly and the second assembly.

According to a third aspect of the invention, a method, comprises: collecting an image of an object by an electronic device comprising an image adjustment module; providing a first adjustment of a first assembly of an image adjustment module using the image adjustment module in a first adjustment mode; switching the image adjustment module to a second adjustment mode; and providing a second adjustment of a second assembly using the image adjustment module, wherein the image adjustment module further comprises: a first lead screw configured to hold and move the first assembly; a second lead screw configured to hold and move the second assembly, wherein the first lead screw and the second lead screw have a common axis; a driving shaft configured to rotate freely inside of the first lead screw and of the second lead screw; and a clutch unit, configured to engage the first lead screw or the second lead screw one at a time, and comprises a rotatable element configured to rotate together with the driving shaft for rotating the first lead screw or the second lead screw one at a time when the clutch is engaged with the first lead screw or the second lead screw in order to provide corresponding movement along the common axis according to a predetermined criterion of the first assembly or the second assembly.

Still yet further according to the first aspect of the invention, before the providing the first adjustment, the method may comprise: switching the image adjustment module to the first adjustment mode.

Further according to the third aspect of the invention, the first assembly may comprise a zoom lens group configured to zoom the optical image of an object, and the second assembly may comprise an auto-focus lens group configured to auto-focus an optical image of the object.

Still further according to the third aspect of the invention, the first assembly or the second assembly may comprise at least one of: a lens group comprising one or more lenses, a shutter, an optical filter, an aperture, and a lens cover.

According yet further to the third aspect of the invention, the clutch unit may further comprise: an actuator; and a bushing rigidly connected to the actuator and configured to move by the actuator along the common axis for engaging with the first lead screw or the second lead screw, wherein the rotatable element is inside of the bushing and configured to provide the engaging of the clutch unit with the first lead screw or the second lead screw to provide the rotating of the first lead screw or of the second lead screw.

According still further to the third aspect of the invention, the driving shaft may comprise a rib configured to rotate the rotatable element.

According yet further still to the third aspect of the invention, the rotatable element may have a toothed shape on top and bottom surfaces to provide gripping with the first lead screw or with the second lead screw to provide the rotating of the first lead screw or of the second lead screw.

According further still to the third aspect of the invention, the first lead screw and the second lead screw may be hollow tubes with threads on an outer surface for providing holding and moving of the first assembly and the second assembly.

According to a fourth aspect of the invention, a computer program product comprises: a computer readable storage structure embodying computer program code thereon for execution by a computer processor with the computer program code, wherein the computer program code comprises instructions for performing the third aspect of the invention, indicated as being performed by any component or a combination of components of an electronic device.

BRIEF DESCRIPTION OF THE DRAWINGS

For a better understanding of the nature and objects of the present invention, reference is made to the following detailed description taken in conjunction with the following drawings, in which:

FIGS. 1a and 1b are schematic views of: a) a conventional implementation of an image adjustment module with a double motor/actuator for adjusting two assemblies, e.g., lens groups such as optical zoom and auto-focus (FIG. 1a), and b) an image adjustment module with a single motor/actuator for adjusting two assemblies (e.g., optical zoom and auto-focus groups) according to an embodiment of the present invention (FIG. 1b);

MODES FOR CARRYING OUT THE INVENTION

Figure 2:
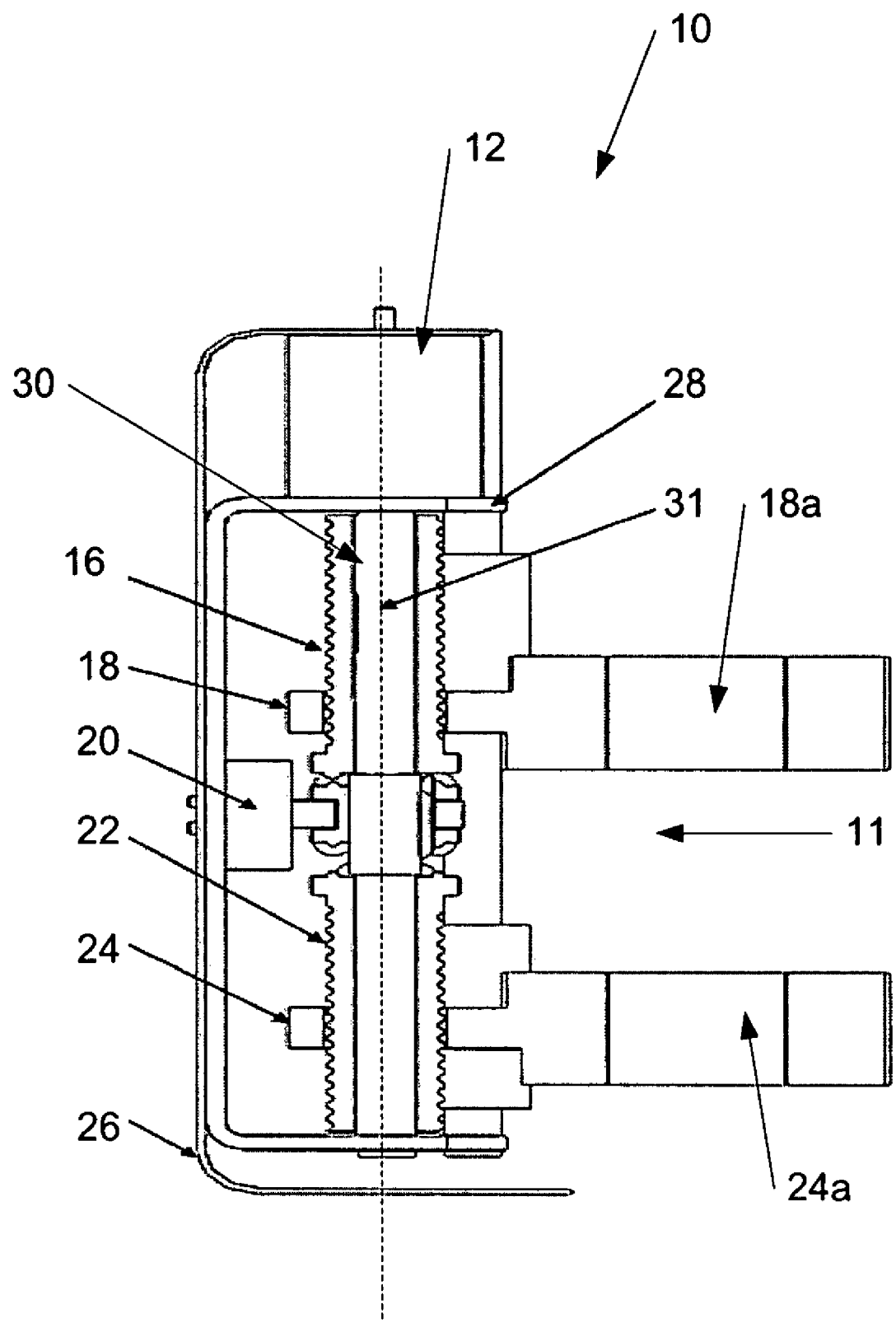
FIG. 2 is a cross sectional view of an image adjustment module (overall construction) with a single motor/actuator for adjusting two assemblies (e.g., optical zoom and auto-focus groups), according to an embodiment of the present invention.

A new apparatus, method and software product are presented for a single motor/actuator adjustment of two assemblies (e.g., for performing zoom and auto-focus functions) for image adjustment using a clutch unit (e.g., a switch) in image adjustment modules of electronic devices. According to an embodiment of the present invention, the clutch unit can be used to engage one of two lead screws having a common axis one at a time with a driving shaft (e.g., having the same common axis), so these two lead screws can operate independently in order to provide adjustments of the two assemblies. One lead screws comprises a first assembly (e.g. a zoom lens group) and another lead screw comprises a second assembly (e.g., an auto-focus lens group) such that when one of these two lead screws is engaged with the driving shaft, it will rotate together with the driving shaft for providing corresponding movement along the common axis according to a predetermined criterion of the first assembly (e.g., the zoom lens group for zooming) or of the second assembly (e.g., the auto-focus lens group for auto-focusing), respectively. The driving shaft can be driven by only one motor (e.g., a stepper motor, a piezo actuator, etc.). The clutch unit can comprise a switch, e.g., a solenoid type magnetic switch or other types of a switch. Using this kind of the structure can result in significant size reduction (e.g., by 50%) compared to conventional double motor/actuator adjustment.

It is noted that using the zoom lens group and the auto-focus lens group is only one example for the first and second assemblies. According to various embodiments of the present invention the first or second assembly can comprise a variety of components or combinations of components which can comprise (but are not limited to): a lens group comprising one or more lenses, a shutter (e.g., a slow motion shutter) activated by rotation, an optical filter (e.g., comprising rotatable color filters), a lens cover activated by rotation, an aperture, etc.

FIGS. 1a and 1b show examples of schematic views of: a) a conventional implementation of an image adjustment module with a double motor/actuator for adjusting two assemblies, e.g., optical zoom and auto-focus groups (FIG. 1a) and an image adjustment module with a single motor/actuator for adjusting two assemblies, e.g., optical zoom and auto-focus groups according to an embodiment of the present invention (FIG. 1b).

By comparing FIGS. 1a and 1b, the improvement is obvious. A conventional image adjustment module 10a of FIG. 1a comprises two motors 12a and 12b, whereas an image adjustment module 10, according to an embodiment of the present invention, comprises only one motor 12. Similarly, the module 10a of FIG. 1a comprises two-axis assemblies 11a and 11b for driving two adjacent lead screw units which are connected to two assemblies, e.g., two lens groups (e.g., for zooming and auto-focus respectively), whereas the module 10 comprises only one common-axis assembly 11 for accomplishing the same goal, thus significantly reducing the amount of space and a number of needed parts.

FIG. 2 shows an example among others of a cross sectional view (overall construction) of an image adjustment module 10 with a single motor/actuator for adjusting two assemblies (e.g., optical zoom and auto-focus groups), according to an embodiment of the present invention.

The module 10 comprises a module holder 28 to hold the motor (e.g., a stepper motor) 12 with Flexible Printed Circuit 26 for electrical connections, and the common-axis assembly 11 which is assembled on a support frame 28, and comprises a clutch unit 20, lead screws 16 and 22 with a common axis 31 for, e.g., zoom and auto-focus adjustment respectively, two lens holders 18 and 24 to hold a first assembly (e.g., a zoom lens group) 18a and a second assembly (e.g., an auto-focus lens group) 24a, and a driving shaft 30 configured to rotate freely around the common axis 31 inside of the two lead screws 16 and 22. The two lead screws can be hollow tubes with threads on an outer surface for providing holding and moving of the assemblies 18a and 24a, respectively.

Figure 3A:
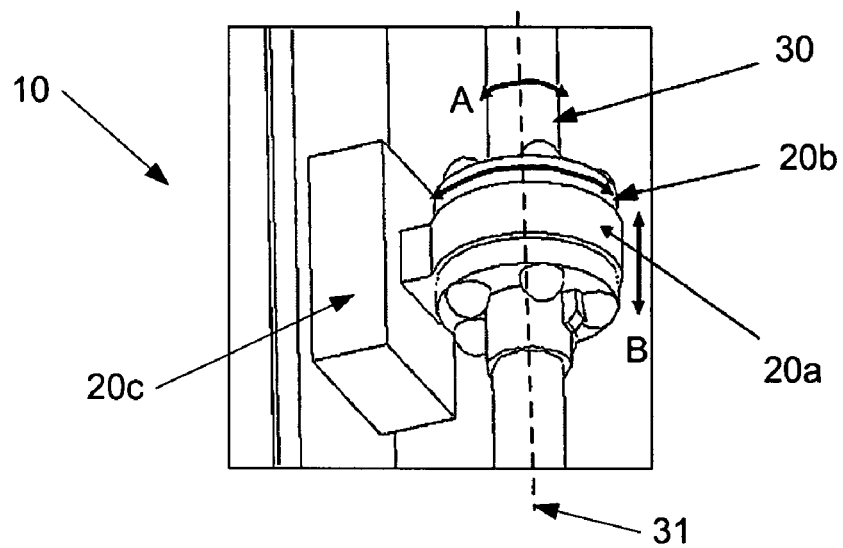
FIGS. 3a and 3b are schematic views of a clutch unit, according to an embodiment of the present invention.
Figure 3B:
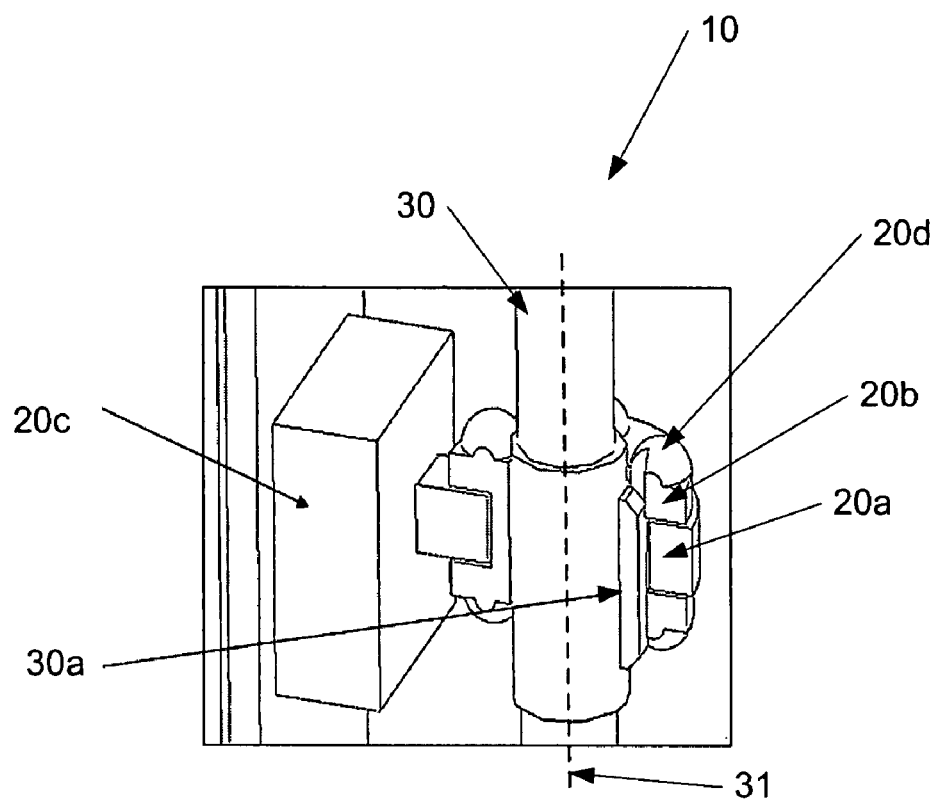

FIGS. 3a and 3b show examples among others of schematic views of a clutch unit 20, according to an embodiment of the present invention.

The clutch unit 20 can comprise an actuator 20c (e.g., a magnetic solenoid) as a switch which creates a short stroke (±0.5 mm) and moves a head of the clutch unit 20 between the two lead screws 16 and 22. The clutch head can comprise a bushing 20a which comprises a rotatable element (e.g., a rotatable disk) 20b. The bushing 20a can move up and down but cannot rotate. The bushing 20a is rigidly connected to the actuator 20c and configured to move by the actuator 20c along the common axis 31 for engaging with the lead screw 16 or 22 (one at a time), wherein the rotatable element 20b is inside of the bushing and configured to provide said engaging of the clutch unit 20 with the lead screw 16 or 22.

A rib 30a (or a similar component) on the side of the driving shaft 30 goes through (i.e., engages) with the rotatable element (disc) 20b and rotates it while the driving shaft 30 is turning, and also allows vertical sliding of the clutch head (comprising the bushing 20a and the rotatable element 20b) along the driving shaft 30 for switching between the lead screws 16 and 22, as described herein. The rotatable element 20b can have tooth-like protrusions 20d on top and bottom surfaces which grip to the lead screws 16 or 22, when the clutch unit 20 engaged on its upper or lower side with the lead screws 16 or 22, one at a time. The driving shaft 30 is connected to the motor 12 and can freely rotate inside the lead screws 16 or 22 in a direction A around the common axis 31 as shown in FIG. 3a.

When the the clutch unit 20 is engaged with one of the lead screws 16 or 22 as described herein, the rotational motion of the driving shaft 30 around a common axis 31 (facilitated by the motor 12) is transferred to a rotation motion of one of the the lead screw 16 or 22 around the same axis 31 according to a predetermined criterion, which is then transferred by the lead screw 16 or 22 to a motion of the assembly 18a or 24a in a direction A parallel to the axis 31 (up and down), as shown in FIG. 3a.

Figure 4:
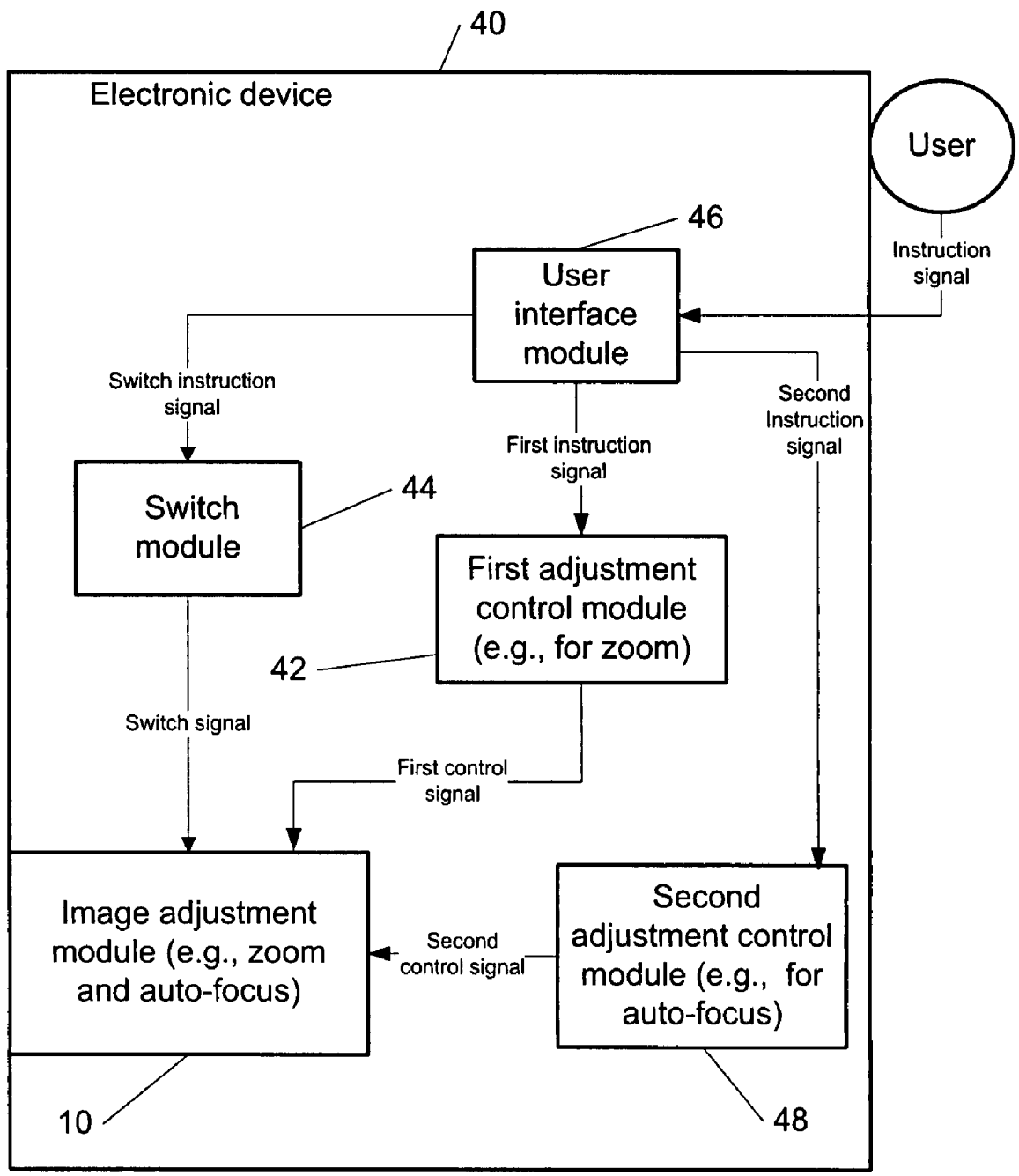
FIG. 4 is a block diagram of an electronic device for adjusting two assemblies (e.g., optical zoom and auto-focus groups) using a single motor/actuator, according to an embodiment of the present invention.

FIG. 4 shows an example among others of a block diagram of an electronic device 40 for adjusting two assemblies (e.g., optical zoom and auto-focus groups) using the image adjustment module 10 with a single motor/actuator, according to an embodiment of the present invention. The electronic device 40 can be, but is not limited to, a camera, a digital camera, a wireless communication device, a mobile phone, a camera-phone mobile device, a portable electronic device, non-portable electronic device, etc.

The electronic device 40 further comprises a user interface module 46 (to enter user's instructions), a switch module 44, a first adjustment control module 42 and a second adjustment control module 48. The user can provide, using the user interface module 46, a switch instructions signal to the switch module 44, which in response provides a switch signal to the image adjustment module 10 in order to switch to a first adjustment mode (e.g., a zoom adjustment mode) or to a second adjustment mode (e.g., an auto-focus adjustment mode), as described herein, e.g., by moving the clutch unit 20. While in the first (e.g., zoom) adjustment mode, the user can provide a first instructions signal to the first adjustment control module 42 (using the user interface module 46) which can further provide a first control signal (e.g., a zoom control signal) to the module 10 to facilitate the first, e.g., zoom, adjustment (e.g., by adjusting the zoom lens group position) according to the predetermined criterion (e.g., using the instructions signal from the user). While in the second (e.g., auto-focus) adjustment mode, the user can provide a second instructions signal to the second adjustment control module 48 (using the user interface module 46) which can further provide a second control signal to the module 10 to facilitate the second, e.g., auto-focus, adjustment (e.g., by adjusting the auto-focus lens group position) according to the predetermined criterion (e.g., using a build-in algorithm).

According to an embodiment of the present invention, the module 42, 44, 46 or 48, can be implemented as a software or a hardware module or a combination thereof. Furthermore, the block 42, 44, 46 or 48 can be implemented as a separate block or can be combined with any other standard block of the electronic device 40 or it can be split into several blocks according to their functionality.

Figure 5:
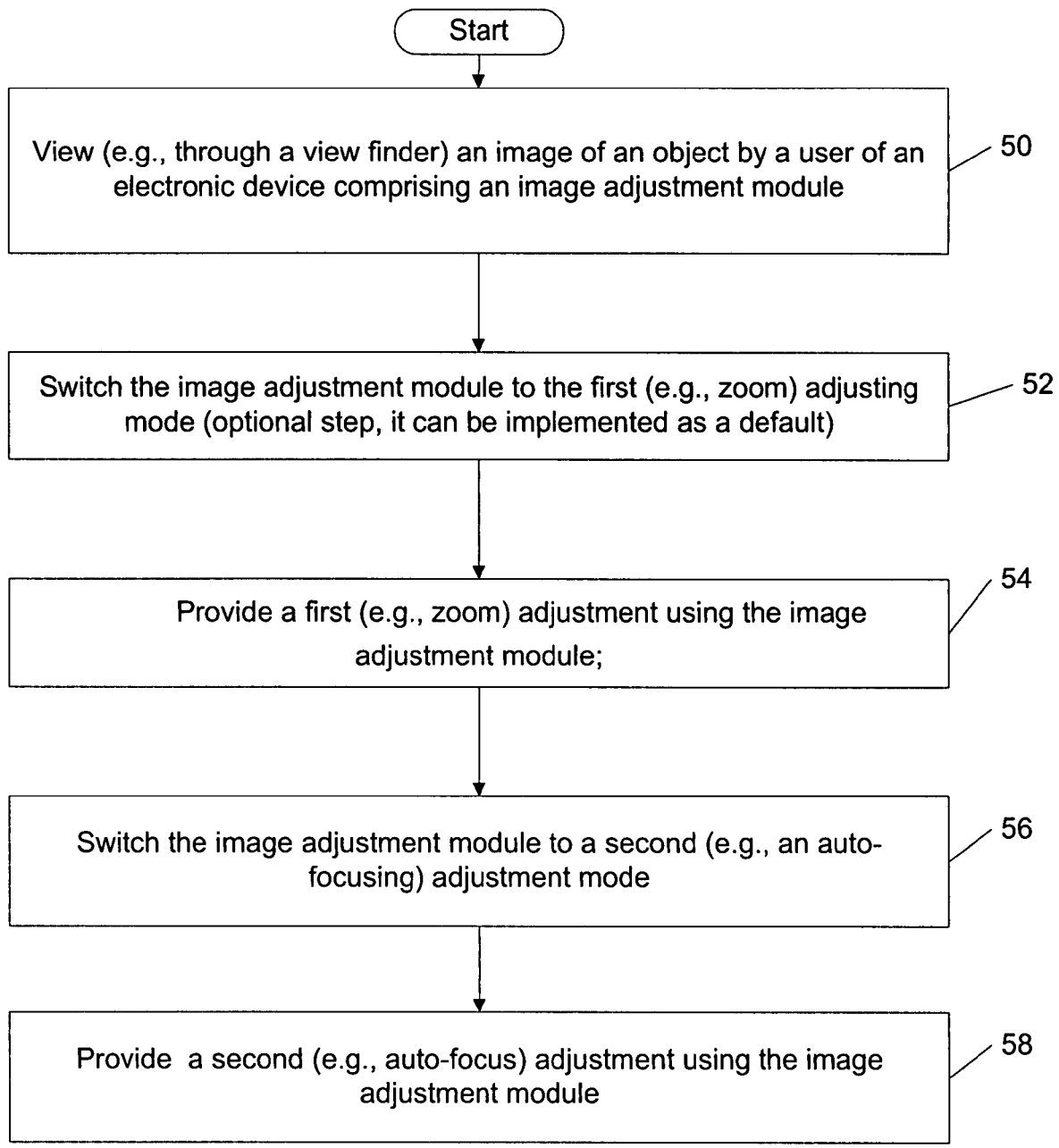
FIG. 5 is a flow chart for adjusting two assemblies (e.g., optical zoom and auto-focus groups) using a single motor/actuator, according to an embodiment of the present invention.

FIG. 5 shows a flow chart for adjusting two assemblies (e.g., optical zoom, and auto-focus groups) using a single motor actuator, according to an embodiment of the present invention. FIGS. 6a through 6d show schematic views of the image adjustment module 10 corresponding to different steps specifically for adjusting zoom and auto-focus as shown in FIG. 5.

Figure 6:
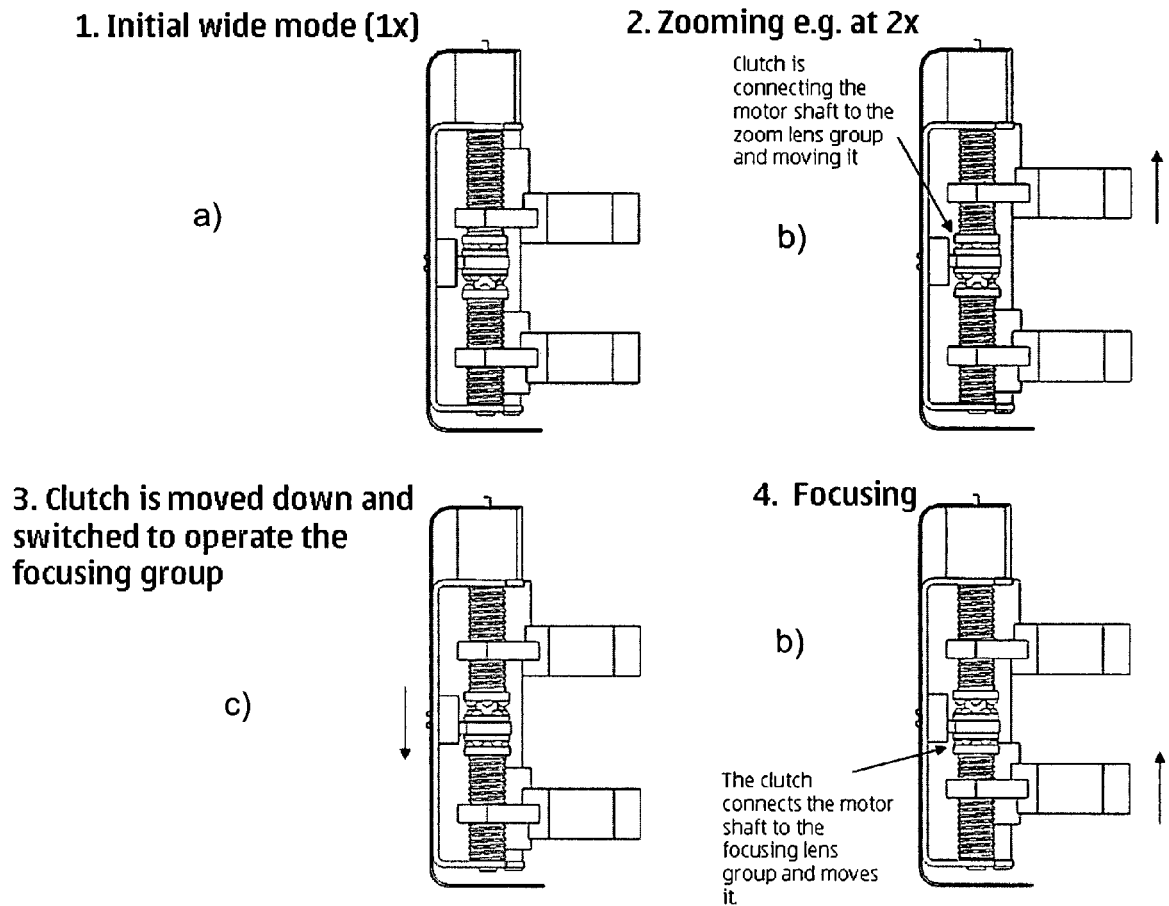
FIGS. 6a-6d are schematic views of an image adjustment module corresponding to different steps for adjusting zoom and auto-focus, according to an embodiment of the present invention.

The flow chart of FIG. 5 only represents one possible scenario among others. It is noted that the order of steps shown in FIG. 5 is not absolutely required, so in principle, the various steps can be performed out of order. In a method according to the embodiment of the present invention, in a first step 50, an image of an object is viewed (e.g., using a view-finder or a display) by a user of an electronic device comprising the image adjustment module 10. The step 50 is illustrated in FIG. 6a.

In a next step 52, the image adjustment module 10 is switched to the first (e.g., zoom) adjustment mode of operation, as described herein. It is note that the step 52 may be optional because the first (e.g., zoom) adjustment mode can be implemented as a default mode. In a next step 54, a first (e.g., zoom) adjustment is provided using the image adjustment module 10, as described herein. The step 54 is illustrated in FIG. 6b.

In a next step 56, the image adjustment module 10 is switched to the second (e.g., auto-focus) adjustment mode, as described herein. The step 56 is illustrated in FIG. 6c. Finally, in a step 58, the second (e.g., auto-focus) adjustment is provided using the image adjustment module 10. The step 58 is illustrated in FIG. 6d.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is noted that various embodiments of the present invention recited herein can be used separately, combined or selectively combined for specific applications.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. An image adjustment module, comprising:
   a first assembly;
   a second assembly;
   a first lead screw configured to hold and move the first assembly;
   a second lead screw configured to hold and move the second assembly, wherein the first lead screw and the second lead screw have a common axis;
   a driving shaft configured to rotate freely inside of said first lead screw and of said second lead screw; and
   a clutch unit, configured to engage the first lead screw or the second lead screw one at a time, and comprises a rotatable element configured to rotate together with said driving shaft for rotating the first lead screw or the second lead screw one at a time when said clutch is engaged with said first lead screw or the second lead screw in order to provide corresponding movement along said common axis according to a predetermined criterion of the first assembly or the second assembly.

2. The image adjustment module of claim 1, wherein said first assembly comprises a zoom lens group configured to zoom said optical image of an object, and the second assembly comprises an auto-focus lens group configured to auto-focus an optical image of the object.

3. The image adjustment module of claim 1, wherein said first assembly or said second assembly comprises at least one of:
   a lens group comprising one or more lenses,
   a shutter,
   an optical filter,
   an aperture, and
   a lens cover.

4. The image adjustment module of claim 1, wherein said clutch unit further comprises:
   an actuator; and
   a bushing rigidly connected to said actuator and configured to move by said actuator along said common axis for engaging with said first lead screw or said second lead screw, wherein
   said rotatable element is inside of said bushing and configured to provide said engaging of the clutch unit with said first lead screw or said second lead screw to provide said rotating of the first lead screw or of the second lead screw.

5. The image adjustment module of claim 4, wherein said actuator is a magnetic solenoid.

6. The image adjustment module of claim 1, wherein said driving shaft comprises a rib configured to rotate said rotatable element.

7. The image adjustment module of claim 1, wherein said rotatable element has a toothed shape on top and bottom surfaces to provide gripping with the first lead screw or with the second lead screw to provide said rotating of the first lead screw or of the second lead screw.

8. The image adjustment module of claim 1, further comprising a motor configured to rotate said driving shaft.

9. The image adjustment module of claim 1, wherein said motor is a stepper motor.

10. The image adjustment module of claim 1, wherein said first lead screw and said second lead screw are hollow tubes with threads on an outer surface for providing holding and moving of the first assembly and the second assembly.

11. The image adjustment module of claim 1, wherein said image adjustment module is a part of an electronic device configured for capturing images.

12. An apparatus, comprising:
   an image adjustment module, which comprises:
      a first assembly;
      a second assembly;
      a first lead screw configured to hold and move the first assembly;
      a second lead screw configured to hold and move the second assembly, wherein the first lead screw and the second lead screw have a common axis;
      a driving shaft configured to rotate freely inside of said first lead screw and of said second lead screw; and
      a clutch unit, configured to engage the first lead screw or the second lead screw one at a time, and comprises a rotatable element configured to rotate together with said driving shaft for rotating the first lead screw or the second lead screw one at a time when said clutch is engaged with said first lead screw or the second lead screw in order to provide corresponding movement along said common axis according to a predetermined criterion of the first assembly or the second assembly; and a switch module, configured to provide a switch signal to said clutch unit for switching said clutch unit to be engaged with the first lead screw or with the second lead screw.

13. The apparatus of claim 12, wherein said first assembly comprises a zoom lens group configured to zoom said optical image of an object, and the second assembly comprises an auto-focus lens group configured to auto-focus an optical image of the object.

14. The apparatus of claim 12, wherein said first assembly or said second assembly comprises at least one of:
a lens group comprising one or more lenses,
a shutter,
an optical filter,
an aperture, and
a lens cover.

15. The apparatus of claim 12, wherein said clutch unit comprises:
an actuator; and
a bushing rigidly connected to said actuator and configured to move by said actuator along said common axis for engaging with said first lead screw or said second lead screw, wherein
said rotatable element is inside of said bushing and configured to provide said engaging of the clutch unit with said first lead screw or said second lead screw to provide said rotating of the first lead screw or of the second lead screw.

16. The apparatus of claim 15, wherein said actuator is a magnetic solenoid.

17. The apparatus of claim 12, wherein said driving shaft comprises a rib configured to rotate said rotatable element.

18. The apparatus of claim 12, wherein said rotatable element has a toothed shape on top and bottom surfaces to provide gripping with the first lead screw or with the second lead screw to provide said rotating of the first lead screw or of the second lead screw.

19. The apparatus of claim 12, further comprising a motor or a stepper motor configured to rotate said driving shaft.

20. The apparatus of claim 12, wherein said first lead screw and said second lead screw are hollow tubes with threads on an outer surface for providing holding and moving of the first assembly and the second assembly.

21. A method, comprising:
collecting an image of an object;
providing a first adjustment of a first assembly of an image adjustment module using said image adjustment module in a first adjustment mode for adjusting said image of the object;
switching said image adjustment module to a second adjustment mode; and
providing a second adjustment of a second assembly using said image adjustment module for further adjusting said image of the object, wherein said image adjustment module comprises:
a first lead screw configured to hold and move the first assembly;
a second lead screw configured to hold and move the second assembly, wherein the first lead screw and the second lead screw have a common axis;
a driving shaft configured to rotate freely inside of said first lead screw and of said second lead screw; and
a clutch unit, configured to engage the first lead screw or the second lead screw one at a time, and comprises a rotatable element configured to rotate together with said driving shaft for rotating the first lead screw or the second lead screw one at a time when said clutch is engaged with said first lead screw or the second lead screw in order to provide corresponding movement along said common axis according to a predetermined criterion of the first assembly or the second assembly.

22. The method of claim 21, wherein before said providing the first adjustment, the method comprises:
switching said image adjustment module to said first adjustment mode.

23. The method of claim 21, wherein said first assembly comprises a zoom lens group configured to zoom said optical image of an object, and the second assembly comprises an auto-focus lens group configured to auto-focus said image of the object.

24. The method of claim 21, wherein said first assembly or said second assembly comprises at least one of:
a lens group comprising one or more lenses,
a shutter,
an optical filter,
an aperture, and
a lens cover.

25. The method of claim 21, wherein said clutch unit further comprises:
an actuator; and
a bushing rigidly connected to said actuator and configured to move by said actuator along said common axis for engaging with said first lead screw or said second lead screw, wherein
said rotatable element is inside of said bushing and configured to provide said engaging of the clutch unit with said first lead screw or said second lead screw to provide said rotating of the first lead screw or of the second lead screw.

26. The method of claim 21, wherein said driving shaft comprises a rib configured to rotate said rotatable element.

27. The method of claim 21, wherein said rotatable element has a toothed shape on top and bottom surfaces to provide gripping with the first lead screw or with the second lead screw to provide said rotating of the first lead screw or of the second lead screw.

28. The method of claim 21, wherein said first lead screw and said second lead screw are hollow tubes with threads on an outer surface for providing holding and moving of the first assembly and the second assembly.

29. A computer program product comprising: a computer readable storage structure embodying computer program code thereon for execution by a computer processor with said computer program code, wherein said computer program code comprises instructions for performing the method of claim 21.

* * * * *